US009934573B2

(12) United States Patent
Reif et al.

(10) Patent No.: US 9,934,573 B2
(45) Date of Patent: Apr. 3, 2018

(54) TECHNOLOGIES FOR ADJUSTING A PERSPECTIVE OF A CAPTURED IMAGE FOR DISPLAY

(71) Applicant: Intel Corporation, Santa Clara, CA (US)

(72) Inventors: Dror Reif, Be'er-Yacoov (IL); Amit Moran, Tel Aviv (IL); Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/488,516

(22) Filed: Sep. 17, 2014

(65) Prior Publication Data

US 2016/0078680 A1 Mar. 17, 2016

(51) Int. Cl.
*G09G 5/00* (2006.01)
*G06T 19/00* (2011.01)
(Continued)

(52) U.S. Cl.
CPC .......... *G06T 7/0044* (2013.01); *G06F 1/163* (2013.01); *G06F 3/011* (2013.01); *G06F 3/013* (2013.01);
(Continued)

(58) Field of Classification Search
CPC ............ A61B 3/113; G02B 2027/0112; G02B 2027/0118; G02B 2027/014;
(Continued)

(56) References Cited

U.S. PATENT DOCUMENTS

| 6,069,608 A * | 5/2000 | Izumi | G02B 27/017 |
| | | | 345/619 |
| 7,271,795 B2 * | 9/2007 | Bradski | G06F 1/1626 |
| | | | 345/158 |

(Continued)

FOREIGN PATENT DOCUMENTS

| JP | 10-112831 | 4/1998 |
| JP | 2003-244726 | 8/2003 |
| KR | 10-2012-0017293 | 2/2012 |

OTHER PUBLICATIONS

"Angular diameter," http://en.wikipedia.org/wiki/Angular_diameter, printed Oct. 31, 2014, 6 pages.
International Search Report for PCT/US15/045517, dated Jan. 22, 2016 (3 pages).
Written Opinion for PCT/US15/045517, dated Jan. 22, 2016 (4 pages).

*Primary Examiner* — Jin-Cheng Wang
(74) *Attorney, Agent, or Firm* — Barnes & Thornburg LLP

(57) ABSTRACT

Technologies for adjusting a perspective of a captured image for display on a mobile computing device include capturing a first image of a user by a first camera and a second image of a real-world environment by a second camera. The mobile computing device determines a position of an eye of the user relative to the mobile computing device based on the first captured image and a distance of an object in the real-world environment from the mobile computing device based on the second captured image. The mobile computing device generates a back projection of the real-world environment captured by the second camera to the display based on the determined distance of the object in the real-world environment relative to the mobile computing device, the determined position of the user's eye relative to the mobile computing device, and at least one device parameter of the mobile computing device.

23 Claims, 8 Drawing Sheets

(51) Int. Cl.
*G06T 19/20* (2011.01)
*G06T 7/00* (2017.01)
*G06F 1/16* (2006.01)
*G06F 3/0346* (2013.01)
*G06F 3/01* (2006.01)
*G02B 27/01* (2006.01)

(52) U.S. Cl.
CPC ............ *G06F 3/0346* (2013.01); *G06T 7/97* (2017.01); *G06T 19/006* (2013.01); *G02B 27/017* (2013.01); *G02B 2027/0112* (2013.01); *G02B 2027/0118* (2013.01); *G02B 2027/0178* (2013.01); *G06F 2200/1637* (2013.01); *G06T 2207/10028* (2013.01); *G06T 2207/30201* (2013.01); *G06T 2207/30244* (2013.01)

(58) Field of Classification Search
CPC .... G02B 2027/0178; G02B 2207/0093; G02B 27/0093; G02B 27/017; G02B 2207/0187; G06F 1/163; G06F 3/013; G06F 2200/1637; G06F 3/011; G06F 3/0346; H04N 13/0468; H04N 7/142; H04N 7/15; G06T 19/006
USPC ...................................... 345/8, 156, 158, 633
See application file for complete search history.

(56) References Cited

U.S. PATENT DOCUMENTS

| | | | |
|---|---|---|---|
| 2011/0140994 A1 | 6/2011 | Noma | |
| 2012/0169846 A1 | 7/2012 | Li | |
| 2012/0242798 A1* | 9/2012 | McArdle | H04N 21/23412 348/46 |
| 2013/0033485 A1* | 2/2013 | Kollin | G06F 1/1637 345/419 |
| 2013/0083007 A1* | 4/2013 | Geisner | G06T 19/006 345/419 |
| 2013/0127980 A1* | 5/2013 | Haddick | G06F 3/013 348/14.08 |
| 2013/0282345 A1* | 10/2013 | McCulloch | G06T 19/006 703/6 |
| 2014/0152558 A1* | 6/2014 | Salter | G06F 3/013 345/157 |
| 2014/0267411 A1* | 9/2014 | Fein | G06T 11/00 345/633 |
| 2014/0285522 A1* | 9/2014 | Kim | G06T 19/006 345/633 |
| 2014/0306994 A1* | 10/2014 | Brown | G06T 19/006 345/633 |
| 2014/0375680 A1* | 12/2014 | Ackerman | G06T 19/006 345/633 |
| 2015/0123966 A1* | 5/2015 | Newman | G06T 19/006 345/419 |

\* cited by examiner

TECHNOLOGIES FOR ADJUSTING A PERSPECTIVE OF A CAPTURED IMAGE FOR DISPLAY

BACKGROUND

Augmented reality systems fuse the real-world and virtual-world environments by projecting virtual characters and objects into physical locations, thereby allowing for immersive experiences and novel interaction models. In particular, in some augmented reality systems, virtual characters or objects may be inserted into captured images of real-world environments (e.g., by overlaying a two- or three-dimensional rendering of a virtual character on a captured image or video stream of the real-world environment). In some systems, a physical object recognized in the captured image may be replaced by a virtual object associated with that physical object. For example, recognized vehicles in the captured image may be recognized and replaced with animated or cartoon-like vehicles.

Augmented reality systems have been implemented in both stationary and mobile computing devices. In some mobile augmented reality systems, a camera of a mobile computing device (e.g., a smart phone camera positioned opposite the display) captures images of the real-world environment. The augmented reality system then makes augmented reality modifications to the captured images and displays the augmented images in the display of the mobile computing device (e.g., in real time). In such a way, the user is able to see a virtual world corresponding with his or her actual real-world environment. However, because the user and the camera of the mobile computing device have different perspectives of the real-world environment, the immersive experience suffers due to an obstructed visual flow. For example, from the user's perspective, real-world objects (e.g., those at the periphery of the mobile computing device) are duplicated in the augmented reality renderings.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
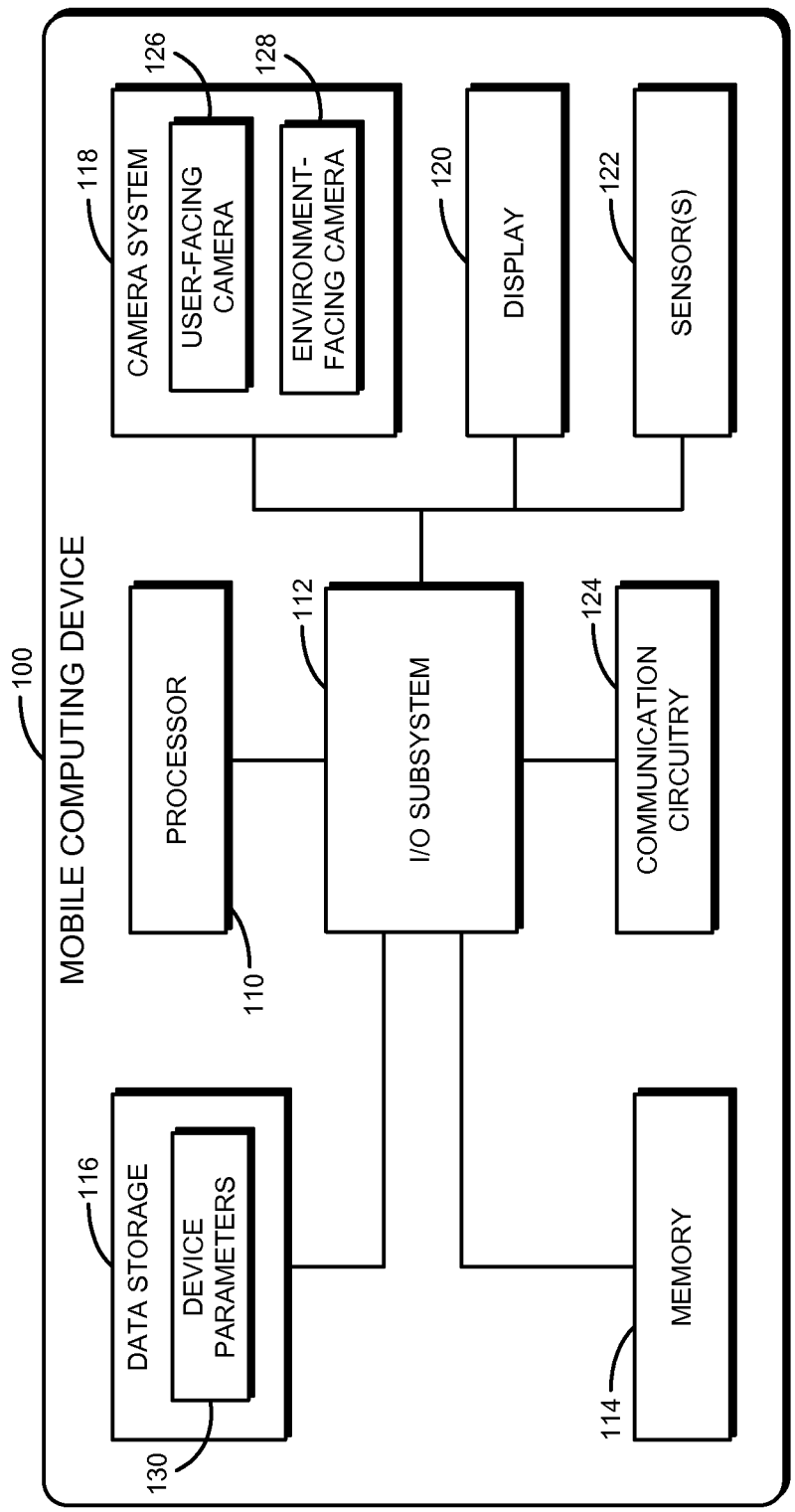
FIG. 1 is a simplified block diagram of at least one embodiment of a mobile computing device for adjusting a perspective of a captured image for display.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a mobile computing device 100 for adjusting a perspective of a captured image for display is shown. In use, as described in more detail below, the mobile computing device 100 is configured to capture an image of a user of the mobile computing device 100 and an image of a real-world environment of the mobile computing device 100. The mobile computing device 100 further analyzes the captured image of the user to determine a position of the user's eye(s) relative to the mobile computing device 100. As discussed below, in doing so, the mobile computing device 100 may determine the distance of the user to the mobile computing device 100 and identify/detect the position of the user's eye(s) in the captured image. Additionally, the mobile computing device 100 determines a distance of one or more objects (e.g., a principal object and/or other objects in the captured scene) in the captured real-world environment relative to the mobile computing device 100. For example, as described below, the mobile computing device 100 may analyze the captured image of the real-world environment, utilize depth or distance sensor data, or otherwise determine the relative distance of the object depending on the particular embodiment. The mobile computing device 100 determines a back projection of the real-world environment to a display 120 of the mobile computing device 100 based on the distance of the real-world object relative to the mobile computing device 100, the position of the user's eye(s) relative to the mobile computing device 100, and one or more device parameters. As discussed below, the back projection may be embodied as a back projection image, a set of data (e.g., pixel values) usable to generate a back projection image, and/or other data indicative of the corresponding back projection image. As discussed below, the device parameters may include, for example, a focal length of a camera of the mobile computing device 100, a size of the display 120 or of the mobile computing device 100 itself, a location of components of the mobile computing device 100 relative to one another or a reference point, and/or other relevant information associated with the mobile computing device 100. The mobile computing device 100 displays an image based on the determined back projection and, in doing so, may apply virtual objects, characters, and/or scenery or otherwise modify the image for augmented reality. It should be appreciated that the techniques described herein result in an image back-projected to the display 120 such that the image visible on the display 120 maps directly, or near directly, to the real world such that the user feels as though she is looking at the real-world environment through a window. That is, in the illustrative embodiment, the displayed image includes the same content as that which is occluded by the mobile computing device 100 viewed from the same perspective as the user.

The mobile computing device 100 may be embodied as any type of computing device capable of performing the functions described herein. For example, the mobile computing device 100 may be embodied as a smartphone, cellular phone, wearable computing device, personal digital assistant, mobile Internet device, tablet computer, netbook, notebook, ultrabook, laptop computer, and/or any other mobile computing/communication device. As shown in FIG. 1, the illustrative mobile computing device 100 includes a processor 110, an input/output ("I/O") subsystem 112, a memory 114, a data storage 116, a camera system 118, a display 120, one or more sensors 122, and a communication circuitry 124. Of course, the mobile computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. In the illustrative embodiment, the data storage 116 may store device parameters 130 of the mobile computing device 100. It should be appreciated that the particular device parameters 130 may vary depending on the particular embodiment. The device parameters 130 may include, for example, information or data associated with a size/shape of the mobile computing device 100, the display 120, and/or another component of the mobile computing device 100, intrinsic parameters or other data regarding one or more cameras of the mobile computing device 100 (e.g., focal length, principle point, zoom information, etc.), a location of components of the mobile computing device 100 relative to a reference point (e.g., a coordinate system identifying relative locations of the components of the mobile computing device 100), and/or other information associated with the mobile computing device 100. Additionally, in some embodiments, the data storage 116 and/or the memory 114 may store various other data useful during the operation of the mobile computing device 100.

The camera system 118 includes a plurality of cameras configured to capture images or video (i.e., collections of images or frames) and capable of performing the functions described herein. It should be appreciated that each of the cameras of the camera system 118 may be embodied as any peripheral or integrated device suitable for capturing images, such as a still camera, a video camera, or other device capable of capturing video and/or images. In the illustrative embodiment, the camera system 118 includes a user-facing camera 126 and an environment-facing camera 128. As indicated below, each of the user-facing camera 126, the environment-facing camera 128, and/or other cameras of the camera system 118 may be embodied as a two-dimensional (2D) camera (e.g., an RGB camera) or a three-dimensional (3D) camera. Such 3D cameras include, for example, depth cameras, bifocal cameras, and/or cameras otherwise capable of generating a depth image, channel, or stream. For example, one or more cameras may include an infrared (IR) projector and an IR sensor such that the IR sensor estimates depth values of objects in the scene by analyzing the IR light pattern projected on the scene by the IR projector. In another embodiment, one or more of the cameras of the camera system 118 include at least two lenses and corresponding sensors configured to capture images from at least two different viewpoints of a scene (e.g., a stereo camera).

As described in greater detail below, the user-facing camera 126 is configured to capture images of the user of the mobile computing device 100. In particular, the user-facing camera 126 captures images of the user's face, which may be analyzed to determine the location of the user's eye(s) relative to the mobile computing device 100 (e.g., relative to the user-facing camera 126 or another reference point of the mobile computing device 100). The environment-facing camera 128 captures images of the real-world environment of the mobile computing device 100. In the illustrative embodiment, the user-facing camera 126 and the environment-facing camera 128 are positioned on opposite sides of the mobile computing device 100 and therefore have fields of view in opposite directions. In particular, the user-facing camera 126 is on the same side of the mobile computing device 100 as the display 120 such that the user-facing camera 126 can capture images of the user as she views the display 120.

The display 120 of the mobile computing device 100 may be embodied as any type of display on which information may be displayed to a user of the mobile computing device 100. Further, the display 120 may be embodied as, or otherwise use any suitable display technology including, for example, a liquid crystal display (LCD), a light emitting diode (LED) display, a cathode ray tube (CRT) display, a plasma display, a touchscreen display, and/or other display technology. Although only one display 120 is shown in the illustrative embodiment of FIG. 1, in other embodiments, the mobile computing device 100 may include multiple displays 120.

As shown in FIG. 1, the mobile computing device 100 may include one or more sensors 122 configured to collect data useful in performing the functions described herein. For example, the sensors 122 may include a depth sensor that may be used to determine the distance of objects from the mobile computing device 100. Additionally, in some embodiments, the sensors 122 may include an accelerometer, gyroscope, and/or magnetometer to determine the relative orientation of the mobile computing device 100. In various embodiments, the sensors 122 may be embodied as, or otherwise include, for example, proximity sensors, optical sensors, light sensors, audio sensors, temperature sensors, motion sensors, piezoelectric sensors, and/or other types of sensors. Of course, the mobile computing device 100 may also include components and/or devices configured to facilitate the use of the sensor(s) 122.

The communication circuitry 124 may be embodied as any communication circuit, device, or collection thereof, capable of enabling communications between the mobile computing device 100 and other remote devices over a network (not shown). For example, in some embodiments, the mobile computing device 100 may offload one or more of the functions described herein (e.g., determination of the back projection) to a remote computing device. The communication circuitry 124 may be configured to use any one or more communication technologies (e.g., wireless or wired communications) and associated protocols (e.g., Ethernet, Bluetooth®, Wi-Fi®, WiMAX, etc.) to effect such communication.

Figure 2:
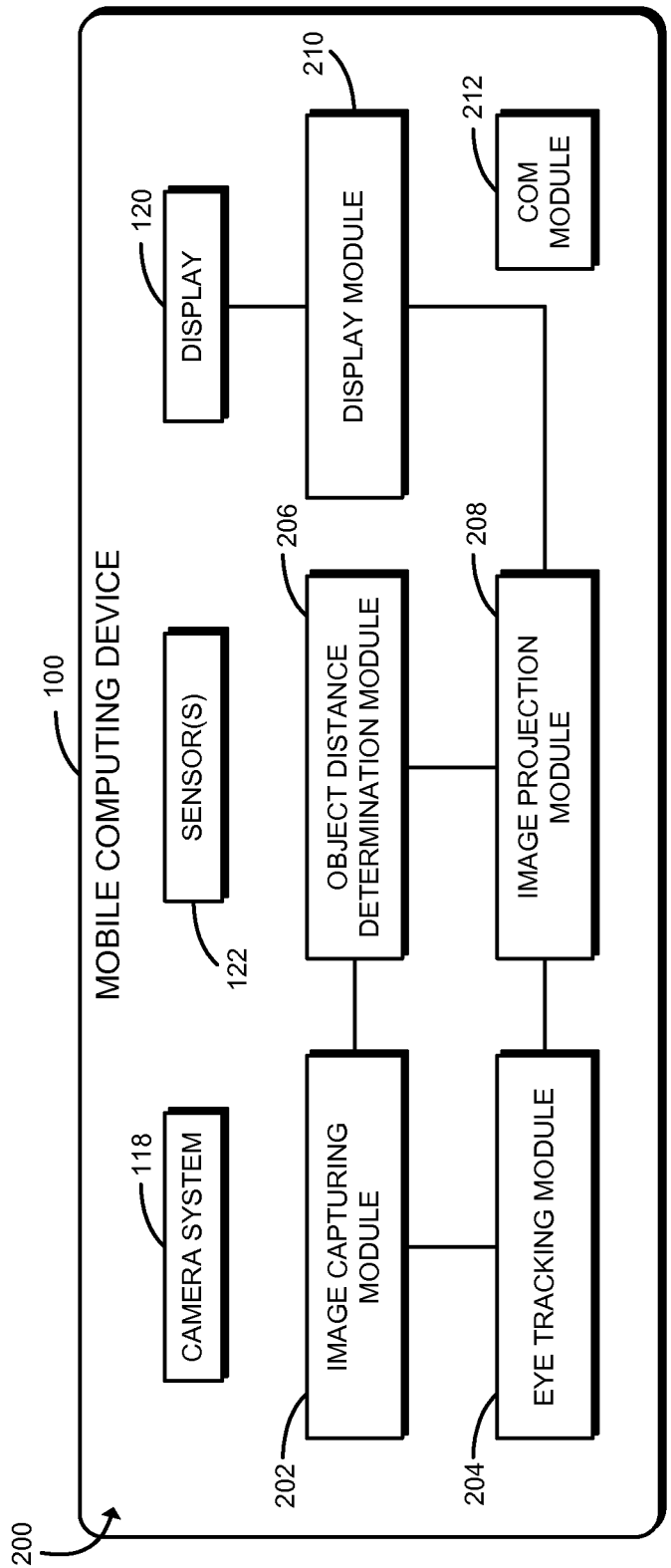
FIG. 2 is a simplified block diagram of at least one embodiment of an environment established by the mobile computing device of FIG. 1.

Referring now to FIG. 2, in use, the mobile computing device 100 establishes an environment 200 for adjusting a perspective of a captured image for display on the display 120 of the mobile computing device 100. As discussed below, the mobile computing device 100 captures an image of the user with the user-facing camera 126 and an image of the real-world environment of the mobile computing device 100 with the environment-facing camera 128. Further, the mobile computing device determines a position of the user's eye(s) relative to the mobile computing device 100 based on the image captured by the user-facing camera 126 and a distance of an object(s) in the real-world environment relative to the mobile computing device 100 based on the image captured by the environment-facing camera 128. The mobile computing device 100 then generates a back projection of the real-world object(s) to the display 120 and displays a corresponding image on the display 120 (e.g., including augmented reality modifications) based on the generated back projection.

The illustrative environment 200 of the mobile computing device 100 includes an image capturing module 202, an eye tracking module 204, an object distance determination module 206, an image projection module 208, and a display module 210. Each of the modules of the environment 200 may be embodied as hardware, software, firmware, or a combination thereof. For example, in an embodiment, each of the modules of the environment 200 is embodied as a circuit (e.g., an image capturing circuit, an eye tracking circuit, an object distance determination circuit, an image projection circuit, and a display circuit). Additionally, in some embodiments, one or more of the illustrative modules may form a portion of another module. For example, in some embodiments, the image projection module 208 may form a portion of the display module 210.

The image capturing module 202 controls the camera system 118 (e.g., the user-facing camera 126 and the environment-facing camera 128) to capture images within the field of view of the respective camera 126, 128. For example, as described herein, the user-facing camera 126 is configured to capture images of the user's face (e.g., for eye detection/tracking). It should be appreciated that the mobile computing device 100 may detect and/or track one or both of the user's eyes and, therefore, in the illustrative embodiment, the images captured by the user-facing camera 126 for analysis by the mobile computing device 100 include at least one of the user's eyes. Although eye tracking and analysis is, at times, discussed herein in reference to a single eye of the user for simplicity and clarity of the description, the techniques described herein equally apply to detecting/tracking both of the user's eyes. Additionally, as described herein, the environment-facing camera 128 is configured to capture images of the real-world environment of the mobile computing device 100. It should be appreciated that the captured scene may include any number of principal objects (e.g., distinct or otherwise important objects) although, for simplicity, such captured images are oftentimes described herein as having a single principal object.

The eye tracking module 204 determines the location/position of the user's eye relative to the mobile computing device 100 (e.g., relative to the user-facing camera 126 or another reference point). In doing so, the eye tracking module 204 detects the existence of one or more person's eyes in an image captured by the user-facing camera 126 and determines the location of the eye in the captured image (i.e., the portion of the image associated with the eye) that is to be tracked. To do so, the eye tracking module 204 may use any suitable techniques, algorithms, and/or image filters (e.g., edge detection and image segmentation). In some embodiments, the eye tracking module 204 determines the location of the user's face in the captured image and utilizes the location of the user's face to, for example, reduce the region of the captured image that is analyzed to locate the user's eye(s). Additionally, in some embodiments, the eye tracking module 204 analyzes the user's eyes to determine various characteristics/features of the user's eyes (e.g., glint location, iris location, pupil location, iris-pupil contrast, eye size/shape, and/or other characteristics) to determine the gaze direction of the user. The user's gaze direction may be used, for example, to determine whether the user is looking at the display 120, to identify objects in the scene captured by the environment-facing camera 128 toward which the user's gaze is directed (e.g., principal objects), to determine a relative location or position (e.g., in three-dimensional space) of the user's eye(s), and/or for other purposes. Additionally, in some embodiments, the eye tracking module 204 may further determine the orientation of the user's head or otherwise determine the user's head pose.

As described below, in determining the position of the user's eye relative to the mobile computing device 100, the eye tracking module 204 determines the distance of the user's eye relative to the mobile computing device 100 (e.g., relative to the user-facing camera 126 or another reference point). It should be appreciated that the eye tracking module 204 may utilize any suitable algorithms and/or techniques for doing so. For example, in some embodiments, the user-facing camera 126 may be embodied as a depth camera or other 3D camera capable of generating data (e.g., a depth stream or depth image) corresponding with the distance of objects in the captured scene. In another embodiment, the eye tracking module 204 may use face detection in conjunction with a known approximate size of a person's face to estimate the distance of the user's face from the mobile computing device 100. In yet another embodiment, the eye tracking module 204 may analyze the region of the captured image corresponding with the user's eye to find reflections of light off the user's cornea (i.e., the glints) and/or pupil. Based on those reflections, the eye tracking module 204 may determine the location or position (e.g., in three-dimensional space) of the user's eye relative to the mobile computing device 100. Further, in some embodiments, the eye tracking module 204 may utilize data generated by the sensors 122 (e.g., depth/distance information) in conjunction with the location of the user's eye in the captured image to determine the location of the user's eye relative to the mobile computing device 100.

The object distance determination module 206 determines the distance of one or more objects in the real-world environment captured by the environment-facing camera 128 relative to the mobile computing device 100 (e.g., relative to the environment-facing camera 128 or another reference point of the mobile computing device 100). As indicated above, the real-world environment within the field of view of and therefore captured by the environment-facing camera 128 may include any number of objects. Accordingly, depending on the particular embodiment, the object distance determination module 206 may determine the distance of each of the objects from the mobile computing device 100 or the distance of a subset of the objects from the mobile computing device 100 (e.g., a single object). For example, in some embodiments, the object distance determination module 206 identifies a principal object in the captured image for which to determine the distance. Such a principal object may be, for example, an object toward which the user's gaze is directed or a main object in the scene. In some embodiments, the object distance determination module 206 assumes that each of the objects in the scene is approximately the same distance from the mobile computing device 100 for simplicity. Further, in some embodiments, the object distance determination module 206 assumes or otherwise sets the distance of the object(s) to a predefined distance from the mobile computing device 100. For example, the predefined distance may be a value significantly greater than the focal length of the environment-facing camera 128, a value approximating infinity (e.g., the largest number in the available number space), or another predefined distance value. For ease of discussion, a number representing infinity may be referred to herein simply as "infinity."

It should be appreciated that the object distance determination module 206 may determine the distance of an object in the real-world environment relative to the mobile computing device 100 using any suitable techniques and/or algorithms. For example, in some embodiments, the object distance determination module 206 may use one or more of the techniques and algorithms described above in reference to determining the distance of the user relative to the mobile computing device 100 (i.e., by the eye tracking module 204). In particular, the environment-facing camera 128 may be embodied as a depth camera or other 3D camera, which generates depth data for determining the distance of objects in the captured image. Additionally or alternatively, the object distance determination module 206 may reference stored data regarding the size of certain objects to estimate the distance of the objects to the mobile computing device 100 in some embodiments. In yet another embodiment, the object distance determination module 206 may utilize data generated by the sensors 122 (e.g., depth/distance information) to determine the distance and/or location of the objects relative to the mobile computing device 100. Of course, in some embodiments, the object distance determination module 206 may assign a distance of a particular object to a predefined value. For example, the object distance determination module 206 may assume the object is infinitely far in response to determining that the object's distance exceeds a predefined threshold. That is, in some embodiments, objects that are at least a threshold distance (e.g., four meters) from the mobile computing device 100 may be treated as though they are, for example, infinitely far from the mobile computing device 100. Such embodiments may appreciate that calculation differences may become negligible (e.g., calculations based on a distance of ten meters and twenty meters may yield approximately the same result). As described below, the distance of the object(s) relative to the mobile computing device 100 (e.g., relative to the camera 128) may be used to determine the location of the object(s) relative to the mobile computing device 100 and to generate a back projection of the real-world environment (e.g., based on the device parameters 130).

The image projection module 208 generates a back projection of the real-world environment captured by the environment-facing camera 128 to the display 120. In the illustrative embodiment, the image projection module 208 generates the back projection based on the distance of the object in the real-world environment relative to the mobile computing device 100 (e.g., infinity, a predefined distance, or the determined distance), the position/location of the user's eye relative to the mobile computing device 100, and/or the device parameters 130 of the mobile computing device 100 (e.g., intrinsic parameters of the cameras 126, 128, the size of the mobile computing device 100 or the display 120, etc.). As indicated above, by back projecting the real-world environment to the display 120 (i.e., toward the user's eye), the visual content occluded by the mobile computing device 100 is shown on the display 120 such that the user feels as though she is looking through a window. In other words, visual continuity is maintained, as objects around the periphery are not duplicated in the displayed image. It should be appreciated that the image projection module 208 may utilize any suitable techniques and/or algorithms for generating the back projection image for display on the display 120 of the mobile computing device 100. As described below, FIGS. 4-8 show illustrative embodiments for doing so.

The display module 210 renders images on the display 120 for the user of the mobile computing device 100 to view. For example, the display module 210 may render an image based on the back projection generated by the image projection module 208 on the display 120. Of course, in some embodiments, the back projections may not be "projected" onto the display 120 in the traditional sense; rather, corresponding images may be generated for rendering on the display 120. Further, as discussed above, in some embodiments, the display module 210 may modify the back projection image to include virtual objects, characters, and/or environments for augmented reality and render the modified image on the display 120.

The communication module 212 handles the communication between the mobile computing device 100 and remote devices through the corresponding network. For example, in some embodiments, the mobile computing device 100 may communicate with a remote computing device to offload one or more of the functions of the mobile computing device 100 described herein to a remote computing device (e.g., for determination of the back projection image or modification of the images for augmented reality). Of course, relevant data associated with such analyses may be transmitted by the remote computing device and received by the communication module 212 of the mobile computing device 100.

Figure 3:
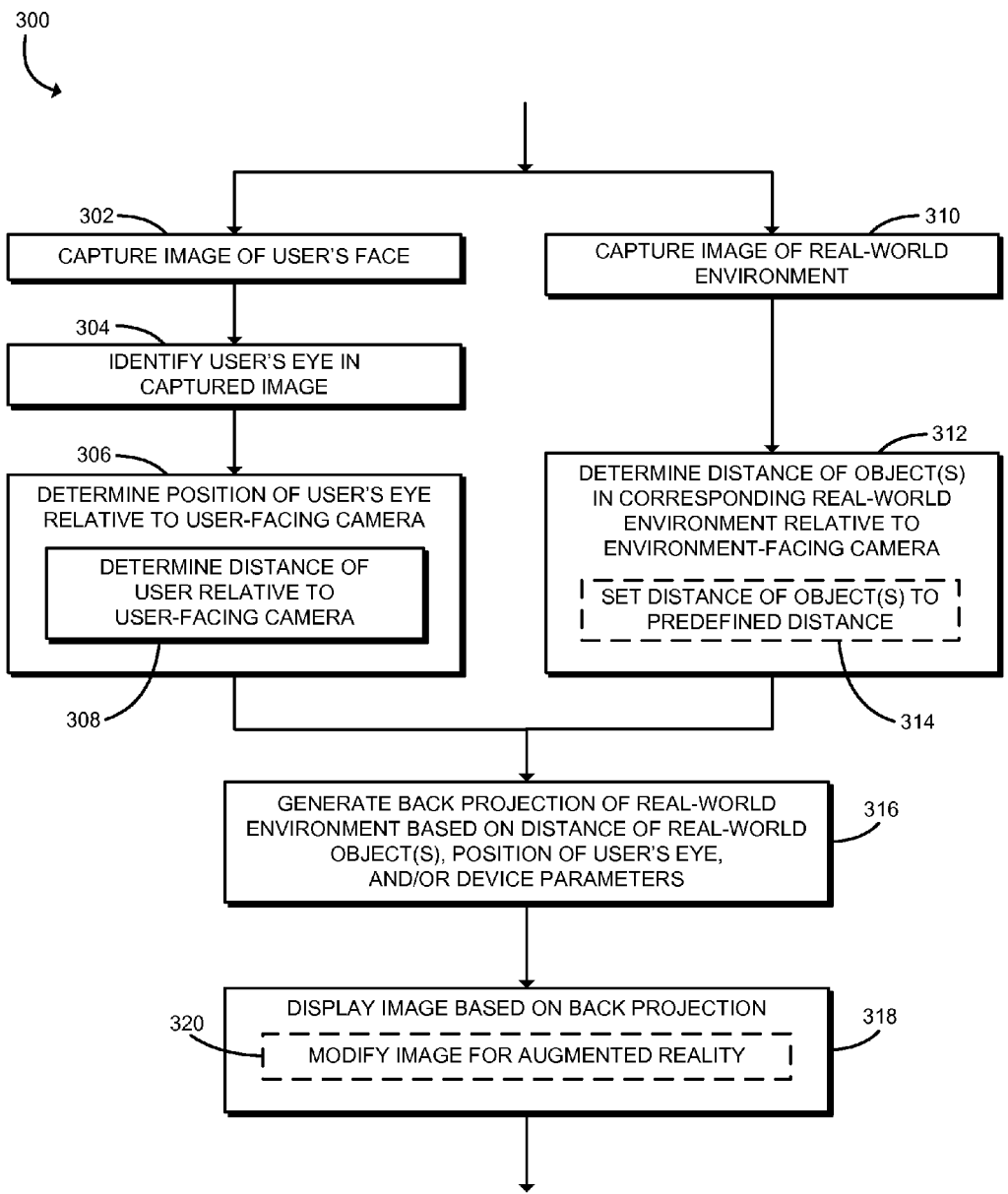
FIG. 3 is a simplified flow diagram of at least one embodiment of a method for adjusting a perspective of a captured image for display by the mobile computing device of FIG. 1.

Referring now to FIG. 3, in use, the mobile computing device 100 may execute a method 300 for adjusting a perspective of a captured image for display by the mobile computing device 100. The illustrative method 300 begins with blocks 302 and 310. In block 302, the mobile computing device 100 captures an image of the user's face with the user-facing camera 126. Depending on the particular embodiment, the user-facing camera 126 may capture images continuously (e.g., as a video stream) for analysis or in response to a user input (e.g., a button press). In block 304, the mobile computing device 100 identifies the user's eye(s) in the captured image. As discussed above, the mobile computing device 100 may utilize any suitable techniques and/or algorithms for doing so (e.g., edge detection and/or image segmentation). Further, depending on the particular embodiment, the mobile computing device 100 may determine and utilize the location of one or both of the user's eyes.

In block 306, the mobile computing device 100 determines the position of the user's eye(s) relative to the user-facing camera 126 or another reference point of the mobile computing device 100. In doing so, the mobile computing device 100 determines the distance of the user, or more particularly, of the user's eye(s) relative to the user-facing camera 126. As discussed above, the mobile computing device 100 may make such a determination based on, for example, a depth image or other depth information generated by the user-facing camera 126 (i.e., if the user-facing camera 126 is a depth camera or other 3D camera), user gaze information, distance information generated by the sensors 122, device parameters 130, and/or other relevant data. The distance of the user relative to the user-facing camera 126 may be used in conjunction with the location of the user's eye(s) in the captured image to determine the position of the user's eye(s) relative to the user-facing camera 126 or other reference point of the mobile computing device 100. It should be appreciated that the device parameters 130 may include information regarding the locations of the components of the mobile computing device 100 relative to one another, thereby establishing a coordinate system having a reference point as the origin. The reference point selected to be the origin may vary depending on the particular embodiment and may be, for example, the location of the user-facing camera 126, the location of the environment-facing camera 128, the center of the display 120, or another suitable location.

As shown, in the illustrative embodiment of FIG. 3, blocks 302-308 and blocks 310-314 occur in parallel; however, in other embodiments, those blocks may be executed serially. In block 310, the mobile computing device 100 captures an image of the real-world environment of the mobile computing device 100 with the environment-facing camera 128. Similar to the user-facing camera 126, depending on the particular embodiment, the environment-facing camera 128 may capture images continuously (e.g., as a video stream) for analysis or in response to a user input such as a button press. For example, in some embodiments, the user may provide some input to commence execution of the method 300 in which the mobile computing device 100 executes each of block 302 and 310. As indicated above, in the illustrative embodiment, the environment-facing camera 128 is position opposite the user-facing camera 126 such that the environment-facing camera 128 has a field of view similar to the user (i.e., in the same general direction).

In block 312, the mobile computing device 100 determines the distance of one or more objects in the corresponding real-world environment relative to the environment-facing camera 128 or another reference point of the mobile computing device 100. As discussed above, the mobile computing device 100 may make such a determination based on, for example, depth information generated by the environment-facing camera 128 (i.e., if the environment-facing camera 128 is a depth camera or other 3D camera), distance information generated by the sensors 122, device parameters 130, and/or other relevant data. Further, the object(s) for which the relative distance is determined may vary depending on the particular embodiment. For example, as discussed above, in some embodiments, the mobile computing device 100 may determine the relative distance of each object or each principal object in the captured image, whereas in other embodiments, the mobile computing device 100 may determine only the relative distance of the main object in the captured image (e.g., the object to which the user's gaze is directed or otherwise determined to be the primary object). Further, as indicated above, the mobile computing device 100 may set the distance of the object(s) to a predefined distance in block 314.

Figure 4:
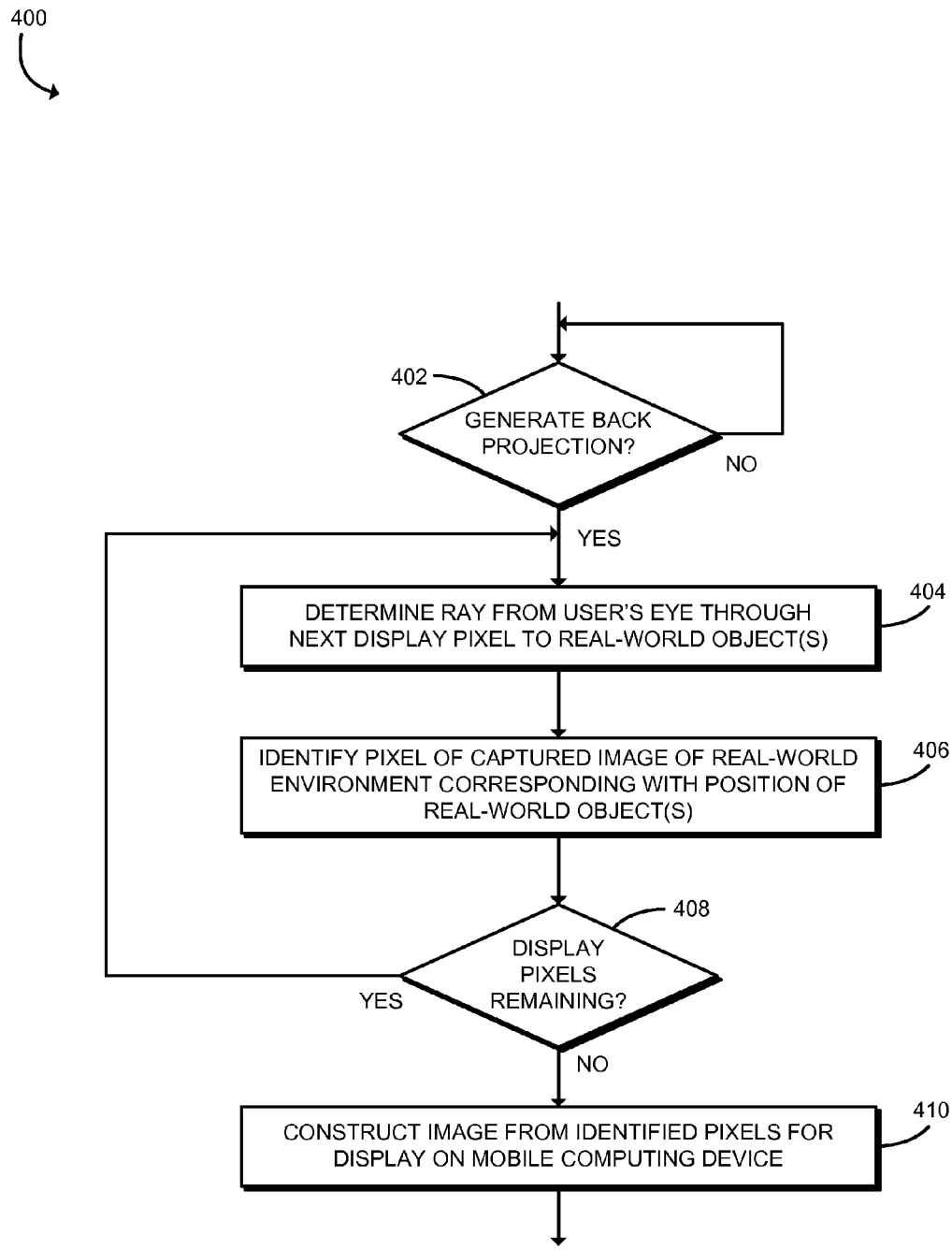
FIG. 4 is a simplified flow diagram of at least one embodiment of a method for generating a back projection of a real-world environment of the mobile computing device of FIG. 1.
Figure 6:
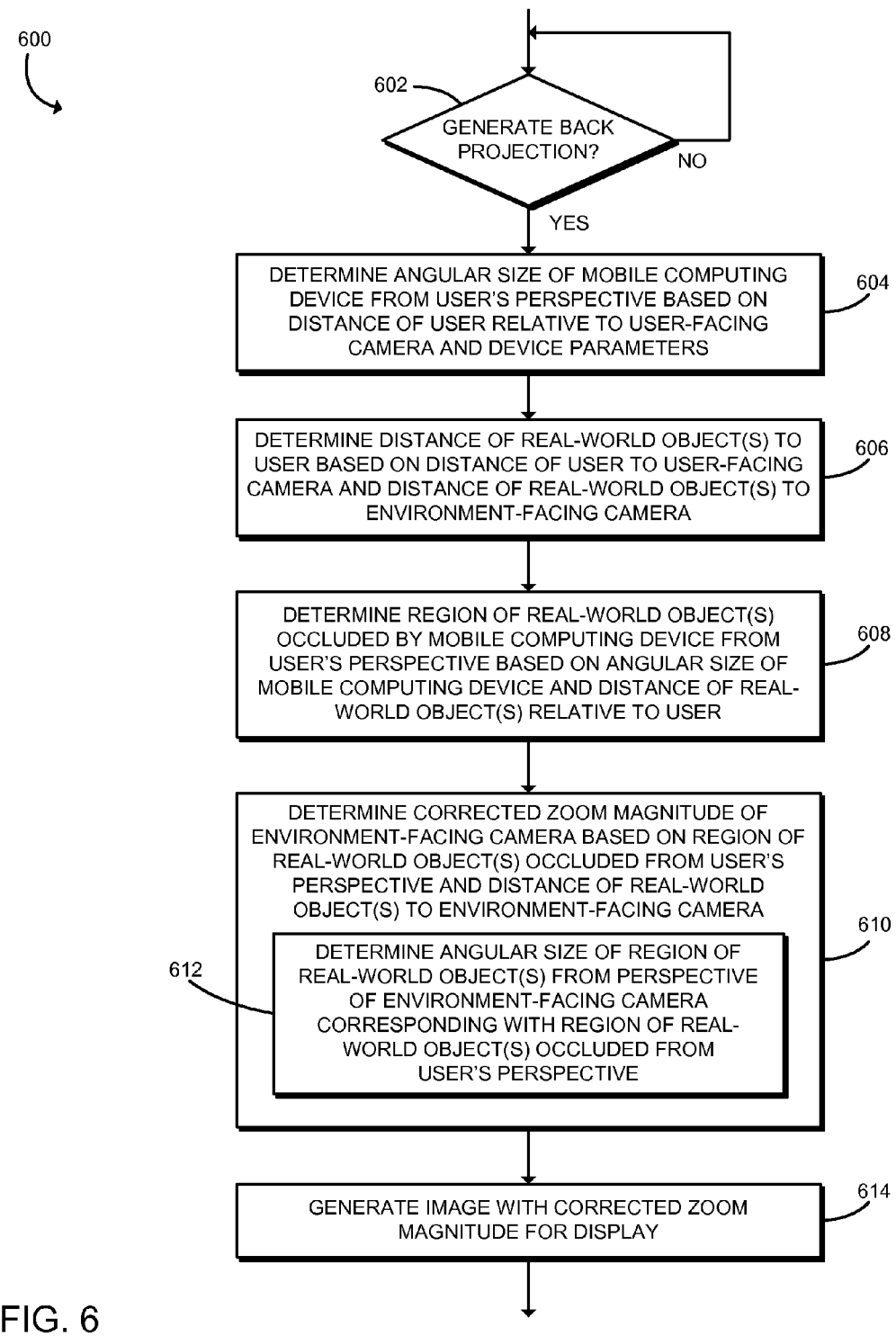
FIG. 6 is simplified flow diagram of at least one other embodiment of a method for generating a back projection of the real-world environment of the mobile computing device of FIG. 1.
Figure 7:
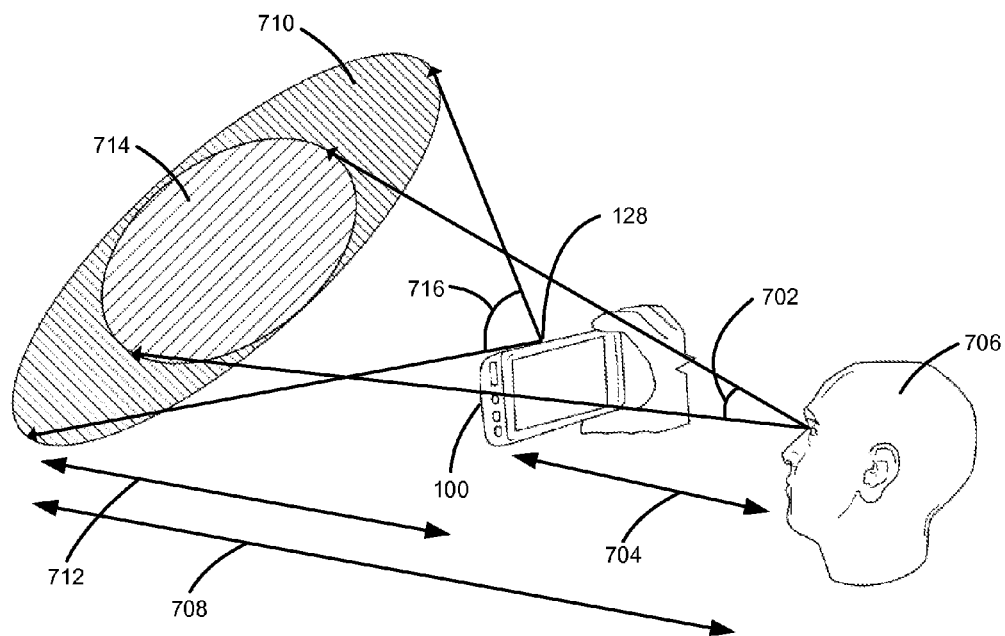
FIGS. 7-8 are simplified illustrations of the user holding the mobile computing device of FIG. 1 showing various angular relationships.
Figure 8:
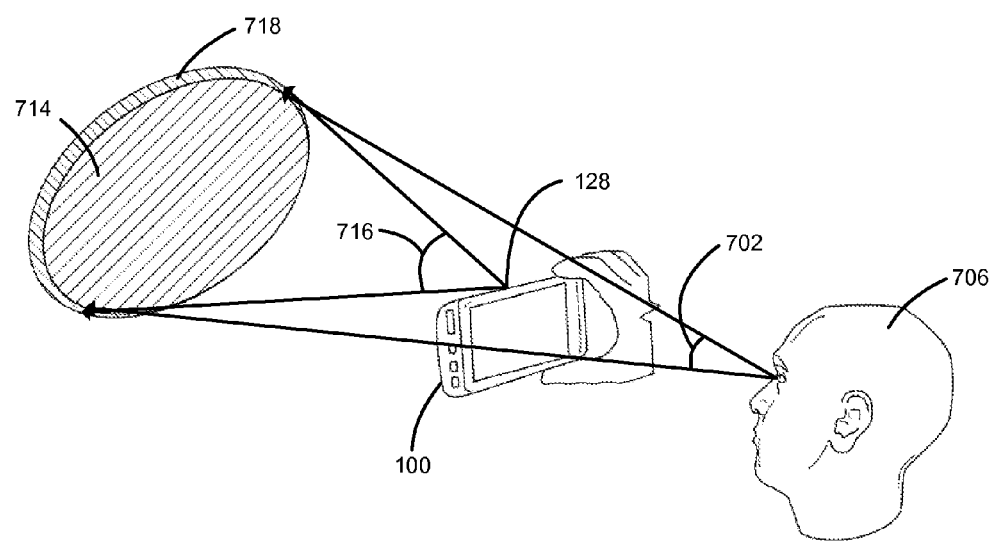
Figure 9:
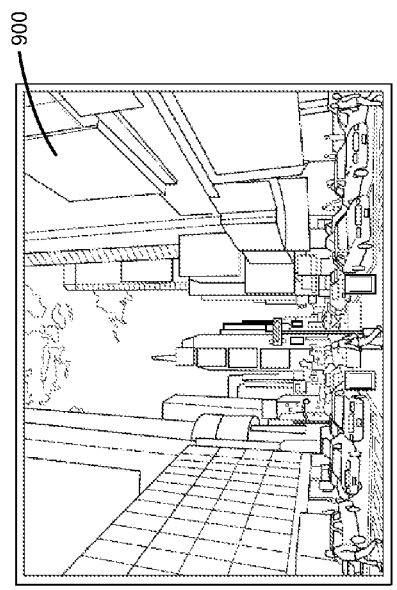
FIG. 9 is a simplified illustration of a real-world environment of the mobile computing device of FIG. 1.

In block 316, the mobile computing device 100 generates a back projection of the real-world environment to the display 120 based on the distance of the real-world object(s) relative to the mobile computing device 100 (e.g., the determined or predefined distance), the position of the user's eye relative to the mobile computing device 100, and/or one or more device parameters 130 (e.g., intrinsic parameters of the cameras 126, 128, the size of the mobile computing device 100 or the display 120, etc.). As indicated above, the mobile computing device 100 may generate a back projection image using any suitable algorithms and/or techniques for doing so. For example, in some embodiments, the mobile computing device 100 may generate a back projection by executing a method 400 as shown in FIG. 4 and, in other embodiments, the mobile computing device 100 may generate the back projection by executing a method 600 as shown in FIG. 6. Of course, it should be appreciated that the embodiments of FIGS. 4 and 9 are provided as illustrative embodiments and do not limit the concepts described herein.

After the back projection has been determined, the mobile computing device 100 displays an image on the display 120 based on the generated back projection in block 318. In doing so, in block 320, the mobile computing device 100 may modify the back projection or corresponding image for augmented reality purposes as discussed above. For example, the mobile computing device 100 may incorporate virtual characters, objects, and/or other virtual features into the constructed/generated back projection image for rendering on the display 120. Of course, in some embodiments, the mobile computing device 100 may not modify the back projection for augmented reality or other purposes such that the viewer truly feels as though the display 120 is a window through which she can see the real-world environment occluded by the mobile computing device 100.

Figure 5:
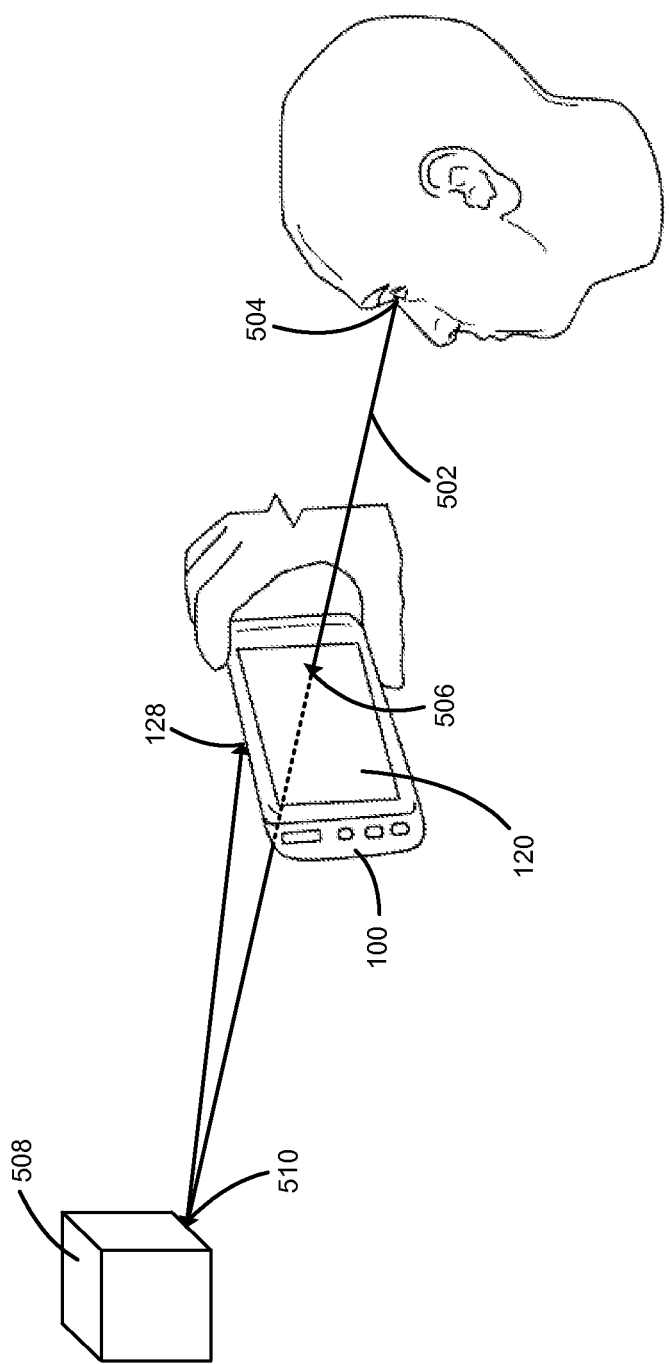
FIG. 5 is a simplified illustration of a user holding the mobile computing device of FIG. 1 during execution of the method of FIG. 4.

Referring now to FIG. 4, the illustrative method 400 begins with block 402 in which the mobile computing device 100 determines whether to generate a back projection. If so, in block 404, the mobile computing device 100 determines a ray 502 from the user's eye 504 through the next display pixel 506 of the display 120 to the real-world object(s) 508 as shown in FIG. 5. It should be appreciated that which display pixel 506 constitutes the "next" display pixel 506 may vary depending on the particular embodiment. In the illustrative embodiment, the mobile computing device 100 selects a display pixel 506 for which a ray 502 has not yet been determined during the execution of the method 400 as the "next" display pixel 506. It should further be appreciated that, in other embodiments, the mobile computing device 100 may determine a ray 502 through another sub-region of the display 120 (i.e., a sub-region other than the display pixels at, for example, a different level of granularity).

As discussed above, the device parameters 130 of the mobile computing device 100 may include data regarding relative locations of the various components of the mobile computing device 100 and establish, for example, a three-dimensional coordinate system having some reference point as the origin. For example, in some embodiments, the environment-facing camera 128 may be the origin. It should be appreciated that every pixel/point on the display 120 is located at some point relative to the environment-facing camera 128. Accordingly, in some embodiments, the mobile computing device 100 determines the corresponding three-dimensional coordinates of the user's eye 504 and the object(s) 508 based on the analyses described above. It should be appreciated that, armed with the coordinates or relative locations of the user's eye 504, the display pixels 506, and the object(s) 508, the mobile computing device 100, in the illustrative embodiment, determines a corresponding ray 502 from the user's eye 504 through each of the display pixels 506 to the object(s) 508.

In block 406, the mobile computing device 100 identifies the image pixel of the image of the real-world environment captured by the environment-facing camera 128 (see block 310 of FIG. 3) corresponding with the position/location 510 of the real-world object(s) to which the corresponding ray 502 is directed. For example, based on the device parameters 130 such as the intrinsic parameters (e.g., focal length) of the environment-facing camera 128 and the real-world coordinates or relative location of the object(s) 508, the mobile computing device 100 may determine how the image captured by the environment-facing camera 128 is projected from the real-world environment to the captured image coordinates. In such embodiments, the mobile computing device 100 may thereby identify the image pixel associated with the real-world coordinates (i.e., the location 510) to which the ray 502 is directed.

In block 408, the mobile computing device 100 determines whether any display pixels 506 are remaining. If so, the method 400 returns to block 404 in which the mobile computing device 100 determines a ray 502 from the user's eye 504 through the next display pixel 506 to the real-world object(s) 508. In other words, the mobile computing device 100 determines a ray 502 from the user's eye 504 through a corresponding display pixel 506 to the object(s) 508 in the real-world environment for each display pixel 506 of the display 120 (or other sub-region of the display 120) and identifies an image pixel of the image of the real-world environment captured by the environment-facing camera 128 corresponding with a location of the object(s) in the real-world environment to which the corresponding ray 502 is directed for each determined ray 502. In block 410, the mobile computing device 100 constructs an image (e.g., a back projection image) from the identified image pixels for display on the mobile computing device 100. In the illustrative embodiment, the mobile computing device 100 generates an image having the identified image pixels in the appropriate image coordinates of the generated image. In other words, the mobile computing device 100 may back project the visual content from a location to which each corresponding ray 502 is directed to the corresponding point on the display 120 through which the ray 502 is directed.

Referring now to FIG. 6, in use, the mobile computing device 100 may execute a method 600 for generating a back projection of the real-world environment of the mobile computing device 100 as indicated above. The illustrative method 600 begins with block 602 in which the mobile computing device 100 determines whether to generate a back projection. If so, in block 604, the mobile computing device 100 determines the angular size 702 of the mobile computing device 100 from the user's perspective based on the distance 704 of the user 706 relative to the user-facing camera 126 (or other reference point of the mobile computing device 100) and device parameters 130 as shown with regard to FIGS. 7-8. As indicated above, the device parameters 130 may include, for example, the size, shaped, and other characteristics of the mobile computing device 100 and/or components of the mobile computing device 100. It should be appreciated that the angular size of an object is indicative of the viewing angle required to encompass the object from a reference point (e.g., a viewer or camera) that is a given distance from the object. In the illustrative embodiment, the angular size of an object (e.g., the mobile computing device 100) from a perspective point (e.g., the user's eye or the environment-facing camera 128) is determined according to $$\delta = 2\arctan\left(\frac{d}{2D}\right),$$

where δ is the angular size of the object, d is an actual size of the corresponding object, and D is a distance between the corresponding object and the perspective point (i.e., the point from which the angular size is determined). In other embodiments, however, the angular size of an object may be otherwise determined. It should further be appreciated that, while the angular size may at times be discussed herein with respect to two dimensions, the techniques described herein may be applied to three dimensions as well (e.g., accounting for both a horizontal angular size and a vertical angular size, determining the angular size across a diagonal of the object, projecting the three-dimensional size to two dimensions, employing a three-dimensional equivalent of the angular size formula provided above, etc.).

In block 606, the mobile computing device 100 determines the distance 708 of the real-world object(s) 710 relative to the user 706. In the illustrative embodiment, the mobile computing device 100 makes such a determination based on the distance 704 of the user 706 to the user-facing camera 126 (see block 308 of FIG. 3) and the distance 712 of the real-world object(s) 710 to the environment-facing camera 128 (see block 312 of FIG. 3) or other reference point of the mobile computing device 100. In doing so, the mobile computing device 100 may, in some embodiments, assume the user 706, the mobile computing device 100, and the object(s) 710 are relatively collinear and add the two previously calculated distances to determine the distance 708 between the user 706 and the real-world object(s) 710 (e.g., if the objects are far from the user). In other embodiments, the mobile computing device 100 may employ a more sophisticated algorithm for determining the distance 708 between the user 706 and the real-world object(s) 710. For example, the mobile computing device 100 may make such a determination based on the relative locations of the mobile computing device 100, the user 706 (or, more particularly, the user's eye(s)), and the object(s) 710 to one another or to a particular reference point (e.g., a defined origin), the mobile computing device 100 and the known distances 704, 712 between the user 706 and the mobile computing device 100 and between the mobile computing device 100 and the object(s) 710 (e.g., based on the properties of a triangle).

In block 608, the mobile computing device 100 determines the region 714 of the real-world object(s) 710 that is occluded by the mobile computing device 100 from the user's perspective. In the illustrative embodiment, the mobile computing device 100 makes such a determination based on the angular size 702 of the mobile computing device 100 from the user's perspective and the distance 708 of the real-world object 710 relative to the user 706.

In block 610, the mobile computing device 100 determines a corrected zoom magnitude of the environment-facing camera 128 based on the region 714 of the real-world object(s) occluded from the user's perspective and the distance 712 of the real-world object(s) to the environment-facing camera 128. In other words, the mobile computing device 100 determines a zoom magnitude of the environment-facing camera 128 needed to capture an image with the environment-facing camera 128 corresponding with the region 714 of the object(s) 710 occluded by the mobile computing device 100 from the user's perspective. As discussed above, the device parameters 130 may include intrinsic parameters (e.g., the focal length, image projection parameters, etc.) of the camera 128. It should be appreciated that such device parameters 130 may be used, in some embodiments, to identify the zoom magnitude corresponding with capturing a particular region of an environment that is a certain distance from the camera 128. In some embodiments, the zoom magnitude is determined such that the environment-facing camera 128 captures an image having only image pixels corresponding with visual content (e.g., features of the object(s) 710) of the object(s) 710 from the region 714 of the object(s) occluded by the mobile computing device 100 from the user's perspective.

In block 612 of the illustrative embodiment, to determine the corrected zoom magnitude, the mobile computing device 100 determines the angular size 716 of a region 718 of the real-world object(s) 710 from the perspective of the environment-facing camera 128 corresponding with the region 714 of the real world object(s) 710 occluded from the user's perspective. The mobile computing device 100 may make such a determination based on, for example, the device parameters 130 and/or corresponding geometry. That is, in some embodiments, the mobile computing device 100 may determine the angular size 716 based on the size of the region 714, the distance 712, and the angular size formula provided above. It should be appreciated that, in some embodiments, the region 718 and the region 714 are the same region, whereas in other embodiments, those reasons may differ to some extent. Similarly, the corrected zoom magnitude may diverge from the precise zoom required to generate the region 718 (e.g., based on technological, hardware, and/or spatial limitations). In block 614, the mobile computing device 100 generates an image with the corrected zoom magnitude for display on the mobile computing device 100. For example, in some embodiments, the mobile computing device 100 may capture a new image with the environment-facing camera 128 from the same perspective but having a different zoom magnitude. In other embodiments, the mobile computing device 100 may, for example, modify the original image captured by the environment-facing camera 128 to generate an image with the desired zoom magnitude and other characteristics.

Figure 11:
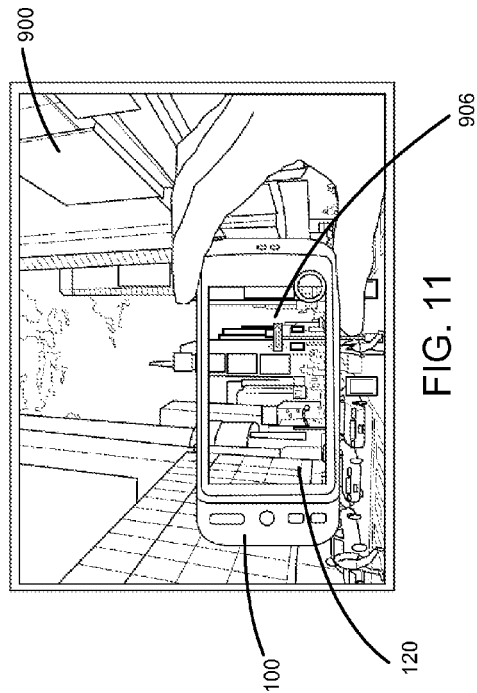
FIG. 11 is a simplified illustration of the user holding the mobile computing device of FIG. 1 and a corresponding captured image displayed on the mobile computing device having an adjusted perspective by virtue of the method of FIG. 3.
Figure 10:
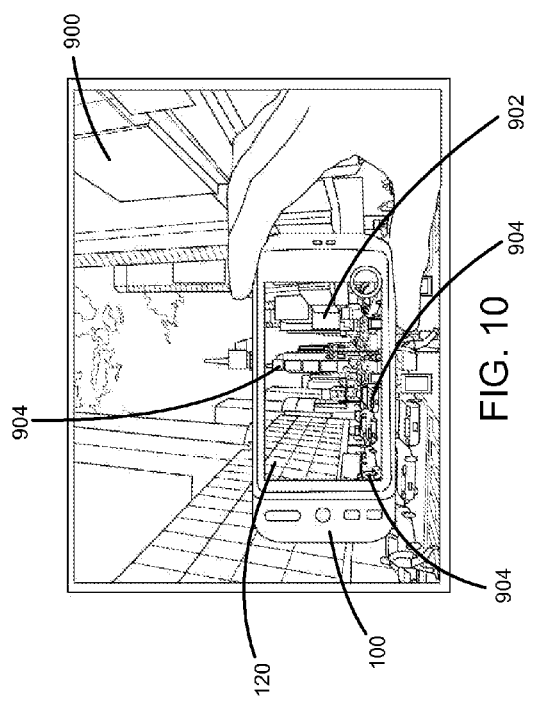
FIG. 10 is a simplified illustration of the user holding the mobile computing device of FIG. 1 and a corresponding captured image displayed on the mobile computing device without an adjusted perspective.

Referring now to FIGS. 9-11, simplified illustrations of a real-world environment 900 (see, for example, FIG. 9) of the mobile computing device 100 and of a user holding the mobile computing device 100 (see FIGS. 10-11) are shown. As discussed above, the real-world environment 900 may be captured by the environment-facing camera 128 and rendered on the display 120. Further, in circumstances in which augmented reality systems are utilized, the captured images may be modified to incorporate, for example, virtual characters, objects, or other features into the captured image for display on the mobile computing device 100. In embodiments in which the method 300 of FIG. 3 is not utilized (i.e., if the captured image or modified version for augmented reality is displayed on the display 120 of the mobile computing device 100), the image 902 displayed on the display 120 includes real-world objects 904 that are also visible in the real-world environment 900 around the periphery of the mobile computing device 100 (see, for example, FIG. 10). In other words, certain real-world objects 904 that are visible to the user are duplicated in the displayed image 902 thereby obstructing the visual flow. However, in embodiments in which the method 300 of FIG. 3 is utilized, the image 906 displayed on the display 120 includes the same visual content as what is occluded by the mobile computing device 100 viewed from the same perspective as the user. Because visual continuity between the displayed image 906 and the background real-world environment 900 is maintained, the user feels as though she is looking at the real-world environment 900 through a window.

EXAMPLES

Illustrative examples of the technologies disclosed herein are provided below. An embodiment of the technologies may include any one or more, and any combination of, the examples described below.

Example 1 includes a mobile computing device for adjusting a perspective of a captured image for display, the mobile computing device comprising a display; a camera system comprising a first camera and a second camera, the camera system to capture (i) a first image of a user of the mobile computing device with the first camera and (i) a second image of a real-world environment of the mobile computing device with the second camera; an eye tracking module to determine a position of an eye of the user relative to the mobile computing device based on the first captured image; an object distance determination module to determine a distance of an object in the real-world environment relative to the mobile computing device based on the second captured image; and an image projection module to generate a back projection of the real-world environment captured by the second camera to the display based on the determined distance of the object in the real-world environment relative to the mobile computing device, the determined position of the user's eye relative to the mobile computing device, and at least one device parameter of the mobile computing device.

Example 2 includes the subject matter of Example 1, and wherein to generate the back projection comprises to determine, for each display pixel of the display, a ray from the user's eye through a corresponding display pixel to the object in the real-world environment; identify, for each determined ray, an image pixel of the second captured image of the real-world environment corresponding with a position of the object in the real-world environment to which the corresponding ray is directed; and construct a back projection image based on the identified image pixels for display on the display of the mobile computing device.

Example 3 includes the subject matter of any of Examples 1 and 2, and wherein to generate the back projection comprises to determine an angular size of the mobile computing device from a perspective of the user; determine a distance of the object in the real-world environment relative to the user; determine a region of the object occluded by the mobile computing device from the user's perspective; determine a corrected zoom magnitude of the second camera based on the determined region of the object occluded by the mobile computing device and the distance of the object relative to the mobile computing device; and generate a back projection image based on the corrected zoom magnitude for display on the display of the mobile computing device.

Example 4 includes the subject matter of any of Examples 1-3, and wherein to determine the corrected zoom magnitude comprises to determine an angular size of a region of the object from a perspective of the second camera corresponding with the region of the object occluded by the mobile computing device from the user's perspective.

Example 5 includes the subject matter of any of Examples 1-4, and wherein the corrected zoom magnitude is a zoom magnitude required to capture an image with the second camera corresponding with the region of the object occluded by the mobile computing device from the user's perspective.

Example 6 includes the subject matter of any of Examples 1-5, and wherein the corrected zoom magnitude is a zoom magnitude required to capture an image with the second camera having only image pixels corresponding with features of the object from the region of the object occluded by the mobile computing device from the user's perspective.

Example 7 includes the subject matter of any of Examples 1-6, and wherein to determine the angular size of the mobile computing device from the user's perspective comprises to determine an angular size of the mobile computing device from the user's perspective based on a distance of the user's eye relative to the mobile computing device and a size of the mobile computing device; determine the distance of the object relative to the user comprises to determine the distance of the object relative to the user based on the distance of the user's eye relative to the mobile computing device and the distance of the object relative to the mobile computing device; and determine the region of the object occluded by the mobile computing device from the user's perspective comprises to determine the angular size of the region of the object occluded by the mobile computing device based on the angular size of the mobile computing device from the user's perspective and the distance of the object relative to the user.

Example 8 includes the subject matter of any of Examples 1-7, and wherein angular size, δ, is determined according to $$\delta = 2\arctan\left(\frac{d}{2D}\right),$$

wherein d is an actual size of a corresponding object and D is a distance between the corresponding object and a point, the point being a perspective from which the angular size is determined.

Example 9 includes the subject matter of any of Examples 1-8, and wherein to capture the first image of the user comprises to capture an image of a face of the user; and determine the position of the user's eye relative to the mobile computing device comprises to identify a location of the user's eye in the image of the user's face.

Example 10 includes the subject matter of any of Examples 1-9, and wherein to determine the position of the user's eye relative to the mobile computing device comprises to determine a distance of the user's eye to the mobile computing device.

Example 11 includes the subject matter of any of Examples 1-10, and wherein to determine the position of the user's eye relative to the mobile computing device comprises to determine a position of the user's eye relative to the first camera; and determine the distance of the object in the real-world environment relative to the mobile computing device comprises to determine a distance of the object relative to the second camera.

Example 12 includes the subject matter of any of Examples 1-11, and wherein the first camera has a field of view in a direction opposite a field of view of the second camera about the display.

Example 13 includes the subject matter of any of Examples 1-12, and wherein to determine the distance of the object in the real-world environment relative to the mobile computing device comprises to set a distance of the object relative to the mobile computing device to a predefined distance.

Example 14 includes the subject matter of any of Examples 1-13, and wherein the predefined distance is greater than a focal length of the second camera.

Example 15 includes the subject matter of any of Examples 1-14, and further including a display module to display an image on the display based on the generated back projection of the real-world environment captured by the second camera.

Example 16 includes the subject matter of any of Examples 1-15, and wherein to display the image based on the generated back projection comprises to display an image corresponding with the back projection modified to include augmented reality features.

Example 17 includes the subject matter of any of Examples 1-16, and wherein the at least one device parameter comprises at least one of (i) a focal length of the second camera, (ii) a size of the display, (iii) a size of the mobile computing device, or (iv) a location of components of the mobile computing device relative to a reference point.

Example 18 includes a method for adjusting a perspective of a captured image for display on a mobile computing device, the method comprising capturing, by a first camera of the mobile computing device, a first image of a user of the mobile computing device; determining, by the mobile computing device, a position of an eye of the user relative to the mobile computing device based on the first captured image; capturing, by a second camera of the mobile computing device different from the first camera, a second image of a real-world environment of the mobile computing device; determining, by the mobile computing device, a distance of an object in the real-world environment relative to the mobile computing device based on the second captured image; and generating, by the mobile computing device, a back projection of the real-world environment captured by the second camera to a display of the mobile computing device based on the determined distance of the object in the real-world environment relative to the mobile computing device, the determined position of the user's eye relative to the mobile computing device, and at least one device parameter of the mobile computing device.

Example 19 includes the subject matter of Example 18, and wherein generating the back projection comprises determining, for each display pixel of the display, a ray from the user's eye through a corresponding display pixel to the object in the real-world environment; identifying, for each determined ray, an image pixel of the second captured image of the real-world environment corresponding with a position of the object in the real-world environment to which the corresponding ray is directed; and constructing a back projection image based on the identified image pixels for display on the display of the mobile computing device.

Example 20 includes the subject matter of any of Examples 18 and 19, and wherein generating the back projection comprises determining an angular size of the mobile computing device from a perspective of the user; determining a distance of the object in the real-world environment relative to the user; determining a region of the object occluded by the mobile computing device from the user's perspective; determining a corrected zoom magnitude of the second camera based on the determined region of the object occluded by the mobile computing device and the distance of the object relative to the mobile computing device; and generating a back projection image based on the corrected zoom magnitude for display on the display of the mobile computing device.

Example 21 includes the subject matter of any of Examples 18-20, and wherein determining the corrected zoom magnitude comprises determining an angular size of a region of the object from a perspective of the second camera corresponding with the region of the object occluded by the mobile computing device from the user's perspective.

Example 22 includes the subject matter of any of Examples 18-21, and wherein the corrected zoom magnitude is a zoom magnitude required to capture an image with the second camera corresponding with the region of the object occluded by the mobile computing device from the user's perspective.

Example 23 includes the subject matter of any of Examples 18-22, and wherein the corrected zoom magnitude is a zoom magnitude required to capture an image with the second camera having only image pixels corresponding with features of the object from the region of the object occluded by the mobile computing device from the user's perspective.

Example 24 includes the subject matter of any of Examples 18-23, and wherein determining the angular size of the mobile computing device from the user's perspective comprises determining an angular size of the mobile computing device from the user's perspective based on a distance of the user's eye relative to the mobile computing device and a size of the mobile computing device; determining the distance of the object relative to the user comprises determining the distance of the object relative to the user based on the distance of the user's eye relative to the mobile computing device and the distance of the object relative to the mobile computing device; and determining the region of the object occluded by the mobile computing device from the user's perspective comprises determining the region of the object occluded by the mobile computing device based on the angular size of the mobile computing device from the user's perspective and the distance of the object relative to the user.

Example 25 includes the subject matter of any of Examples 18-24, and wherein angular size, δ, is determined according to $$\delta = 2\arctan\left(\frac{d}{2D}\right),$$

wherein d is an actual size of a corresponding object and D is a distance between the corresponding object and a point, the point being a perspective from which the angular size is determined.

Example 26 includes the subject matter of any of Examples 18-25, and wherein capturing the first image of the user comprises capturing an image of a face of the user; and determining the position of the user's eye relative to the mobile computing device comprises identifying a location of the user's eye in the image of the user's face.

Example 27 includes the subject matter of any of Examples 18-26, and wherein determining the position of the user's eye relative to the mobile computing device comprises determining a distance of the user's eye to the mobile computing device.

Example 28 includes the subject matter of any of Examples 18-27, and wherein determining the position of the user's eye relative to the mobile computing device comprises determining a position of the user's eye relative to the first camera; and determining the distance of the object in the real-world environment relative to the mobile computing device comprises determining a distance of the object relative to the second camera.

Example 29 includes the subject matter of any of Examples 18-28, and wherein the first camera has a field of view in a direction opposite a field of view of the second camera about the display.

Example 30 includes the subject matter of any of Examples 18-29, and wherein determining the distance of the object in the real-world environment relative to the mobile computing device comprises setting a distance of the object relative to the mobile computing device to a predefined distance.

Example 31 includes the subject matter of any of Examples 18-30, and wherein the predefined distance is greater than a focal length of the second camera.

Example 32 includes the subject matter of any of Examples 18-31, and further including displaying, by the mobile computing device, an image on the display based on the generated back projection of the real-world environment captured by the second camera.

Example 33 includes the subject matter of any of Examples 18-32, and wherein displaying the image based on the generated back projection comprises displaying an image corresponding with the back projection modified to include augmented reality features.

Example 34 includes the subject matter of any of Examples 18-33, and wherein the at least one device parameter comprises at least one of (i) a focal length of the second camera, (ii) a size of the display, (iii) a size of the mobile computing device, or (iv) a location of components of the mobile computing device relative to a reference point.

Example 35 includes a mobile computing device comprising a processor; and a memory having stored therein a plurality of instructions that when executed by the processor cause the mobile computing device to perform the method of any of Examples 18-34.

Example 36 includes one or more machine-readable storage media comprising a plurality of instructions stored thereon that, in response to being executed, result in a mobile computing device performing the method of any of Examples 18-34.

Example 37 includes a mobile computing device for adjusting a perspective of a captured image for display, the mobile computing device comprising means for capturing, by a first camera of the mobile computing device, a first image of a user of the mobile computing device; means for determining a position of an eye of the user relative to the mobile computing device based on the first captured image; means for capturing, by a second camera of the mobile computing device different from the first camera, a second image of a real-world environment of the mobile computing device; means for determining a distance of an object in the real-world environment relative to the mobile computing device based on the second captured image; and means for generating a back projection of the real-world environment captured by the second camera to a display of the mobile computing device based on the determined distance of the object in the real-world environment relative to the mobile computing device, the determined position of the user's eye relative to the mobile computing device, and at least one device parameter of the mobile computing device.

Example 38 includes the subject matter of Example 37, and wherein the means for generating the back projection comprises means for determining, for each display pixel of the display, a ray from the user's eye through a corresponding display pixel to the object in the real-world environment; means for identifying, for each determined ray, an image pixel of the second captured image of the real-world environment corresponding with a position of the object in the real-world environment to which the corresponding ray is directed; and means for constructing a back projection image based on the identified image pixels for display on the display of the mobile computing device.

Example 39 includes the subject matter of any of Examples 37 and 38, and wherein the means for generating the back projection comprises means for determining an angular size of the mobile computing device from a perspective of the user; means for determining a distance of the object in the real-world environment relative to the user; means for determining a region of the object occluded by the mobile computing device from the user's perspective; means for determining a corrected zoom magnitude of the second camera based on the determined region of the object occluded by the mobile computing device and the distance of the object relative to the mobile computing device; and means for generating a back projection image based on the corrected zoom magnitude for display on the display of the mobile computing device.

Example 40 includes the subject matter of any of Examples 37-39, and wherein the means for determining the corrected zoom magnitude comprises means for determining an angular size of a region of the object from a perspective of the second camera corresponding with the region of the object occluded by the mobile computing device from the user's perspective.

Example 41 includes the subject matter of any of Examples 37-40, and wherein the corrected zoom magnitude is a zoom magnitude required to capture an image with the second camera corresponding with the region of the object occluded by the mobile computing device from the user's perspective.

Example 42 includes the subject matter of any of Examples 37-41, and wherein the corrected zoom magnitude is a zoom magnitude required to capture an image with the second camera having only image pixels corresponding with features of the object from the region of the object occluded by the mobile computing device from the user's perspective.

Example 43 includes the subject matter of any of Examples 37-42, and wherein the means for determining the angular size of the mobile computing device from the user's perspective comprises means for determining an angular size of the mobile computing device from the user's perspective based on a distance of the user's eye relative to the mobile computing device and a size of the mobile computing device; means for determining the distance of the object relative to the user comprises means for determining the distance of the object relative to the user based on the distance of the user's eye relative to the mobile computing device and the distance of the object relative to the mobile computing device; and means for determining the region of the object occluded by the mobile computing device from the user's perspective comprises means for determining the region of the object occluded by the mobile computing device based on the angular size of the mobile computing device from the user's perspective and the distance of the object relative to the user.

Example 44 includes the subject matter of any of Examples 37-43, and wherein angular size, $\delta$, is determined according to $$\delta = 2\arctan\left(\frac{d}{2D}\right),$$

wherein d is an actual size of a corresponding object and D is a distance between the corresponding object and a point, the point being a perspective from which the angular size is determined.

Example 45 includes the subject matter of any of Examples 37-44, and wherein the means for capturing the first image of the user comprises means for capturing an image of a face of the user; and means for determining the position of the user's eye relative to the mobile computing device comprises means for identifying a location of the user's eye in the image of the user's face.

Example 46 includes the subject matter of any of Examples 37-45, and wherein the means for determining the position of the user's eye relative to the mobile computing device comprises means for determining a distance of the user's eye to the mobile computing device.

Example 47 includes the subject matter of any of Examples 37-46, and wherein the means for determining the position of the user's eye relative to the mobile computing device comprises means for determining a position of the user's eye relative to the first camera; and means for determining the distance of the object in the real-world environment relative to the mobile computing device comprises means for determining a distance of the object relative to the second camera.

Example 48 includes the subject matter of any of Examples 37-47, and wherein the first camera has a field of view in a direction opposite a field of view of the second camera about the display.

Example 49 includes the subject matter of any of Examples 37-48, and wherein the means for determining the distance of the object in the real-world environment relative to the mobile computing device comprises means for setting a distance of the object relative to the mobile computing device to a predefined distance.

Example 50 includes the subject matter of any of Examples 37-49, and wherein the predefined distance is greater than a focal length of the second camera.

Example 51 includes the subject matter of any of Examples 37-50, and further including means for displaying an image on the display based on the generated back projection of the real-world environment captured by the second camera.

Example 52 includes the subject matter of any of Examples 37-51, and wherein the means for displaying the image based on the generated back projection comprises means for displaying an image corresponding with the back projection modified to include augmented reality features.

Example 53 includes the subject matter of any of Examples 37-52, and wherein the at least one device parameter comprises at least one of (i) a focal length of the second camera, (ii) a size of the display, (iii) a size of the mobile computing device, or (iv) a location of components of the mobile computing device relative to a reference point.

The invention claimed is:

1. A mobile computing device for adjusting a perspective of a captured image for display, the mobile computing device comprising:
a permanently non-transparent display;
a camera system comprising a first camera and a second camera, the camera system to capture, while the user is holding the mobile computing device, (i) a first image of a user of the mobile computing device with the first camera and (ii) a second image of a real-world environment of the mobile computing device with the second camera;
an eye tracking module to determine a position of an eye of the user relative to the mobile computing device based on the first captured image;
an object distance determination module to determine a distance of an object in the real-world environment relative to the mobile computing device based on the second captured image; and
an image projection module to (i) determine an angular size of the mobile computing device from a perspective of the user, (ii) determine a distance of the object in the real-world environment relative to the user, (iii) determine a region of the object occluded by the permanently non-transparent display from the user's perspective, (iv) determine a corrected zoom magnitude of the second camera based on the determined region of the object occluded by the permanently non-transparent display and the distance of the object relative to the mobile computing device, and (v) generate, on the permanently non-transparent display of the mobile computing device, a back projection image of the real-world environment captured by the second camera to the permanently non-transparent display based on the corrected zoom magnitude, the determined position of the user's eye relative to the mobile computing device, and at least one device parameter of the mobile computing device such that the back projection image is approximately equivalent to the view of the user of the real world that is occluded by the permanently non-transparent display.

2. The mobile computing device of claim 1, wherein to generate the back projection comprises to:
determine, for each display pixel of the permanently non-transparent display, a ray from the user's eye through a corresponding display pixel to the object in the real-world environment;
identify, for each determined ray, an image pixel of the second captured image of the real-world environment corresponding with a position of the object in the real-world environment to which the corresponding ray is directed; and
construct a back projection image based on the identified image pixels for display on the permanent non-transparent display of the mobile computing device.

3. The mobile computing device of claim 1, wherein to determine the corrected zoom magnitude comprises to determine an angular size of a region of the object from a perspective of the second camera corresponding with the region of the object occluded by the mobile computing device from the user's perspective.

4. The mobile computing device of claim 1, wherein the corrected zoom magnitude is a zoom magnitude required to capture an image with the second camera corresponding with the region of the object occluded by the mobile computing device from the user's perspective.

5. The mobile computing device of claim 4, wherein the corrected zoom magnitude is a zoom magnitude required to capture an image with the second camera having only image pixels corresponding with features of the object from the region of the object occluded by the mobile computing device from the user's perspective.

6. The mobile computing device of claim 1, wherein to:
determine the angular size of the mobile computing device from the user's perspective comprises to determine an angular size of the mobile computing device from the user's perspective based on a distance of the user's eye relative to the mobile computing device and a size of the mobile computing device;

determine the distance of the object relative to the user comprises to determine the distance of the object relative to the user based on the distance of the user's eye relative to the mobile computing device and the distance of the object relative to the mobile computing device; and determine the region of the object occluded by the mobile computing device from the user's perspective comprises to determine the angular size of the region of the object occluded by the mobile computing device based on the angular size of the mobile computing device from the user's perspective and the distance of the object relative to the user.

7. The mobile computing device of claim 1, wherein angular size, δ, is determined according to $$\delta = 2\arctan\left(\frac{d}{2D}\right),$$

wherein d is an actual size of a corresponding object and D is a distance between the corresponding object and a point, the point being a perspective from which the angular size is determined.

8. The mobile computing device of claim 1, wherein to:
determine the position of the user's eye relative to the mobile computing device comprises to determine a position of the user's eye relative to the first camera; and
determine the distance of the object in the real-world environment relative to the mobile computing device comprises to determine a distance of the object relative to the second camera.

9. The mobile computing device of claim 1, wherein the first camera has a field of view in a direction opposite a field of view of the second camera about the permanently non-transparent display.

10. The mobile computing device of claim 1, wherein to determine the distance of the object in the real-world environment relative to the mobile computing device comprises to set a distance of the object relative to the mobile computing device to a predefined distance.

11. The mobile computing device of claim 1, further comprising a display module to display an image on the permanently non-transparent display based on the generated back projection of the real-world environment captured by the second camera.

12. The mobile computing device of claim 11, wherein to display the image based on the generated back projection comprises to display an image corresponding with the back projection modified to include augmented reality features.

13. The mobile computing device of claim 1, wherein the at least one device parameter comprises at least one of (i) a focal length of the second camera, (ii) a size of the permanently non-transparent display, (iii) a size of the mobile computing device, or (iv) a location of components of the mobile computing device relative to a reference point.

14. One or more non-transitory machine-readable storage media comprising a plurality of instructions stored thereon that, in response to execution by a mobile computing device, cause the mobile computing device to:

capture, by a first camera of the mobile computing device and while the user is holding the mobile computing device, a first image of a user of the mobile computing device;

determine a position of an eye of the user relative to the mobile computing device based on the first captured image;

capture, by a second camera of the mobile computing device different from the first camera, a second image of a real-world environment of the mobile computing device;

determine a distance of an object in the real-world environment relative to the mobile computing device based on the second captured image;

determine an angular size of the mobile computing device from a perspective of the user based on a distance of the user's eye relative to the mobile computing device and a size of the mobile computing device;

determine a distance of the object in the real-world environment relative to the user based on the distance of the user's eye relative to the mobile computing device and the distance of the object relative to the mobile computing device;

determine a region of the object occluded by a permanently non-transparent display of the mobile computing device from the user's perspective based on the angular size of the mobile computing device from the user's perspective and the distance of the object relative to the user; and determine a corrected zoom magnitude of the second camera based on the determined region of the object occluded by the permanently non-transparent display and the distance of the object relative to the mobile computing device; and generate, on the permanently non-transparent display of the mobile computing device, a back projection image of the real-world environment captured by the second camera to the permanently non-transparent display of the mobile computing device based on the corrected zoom magnitude, the determined position of the user's eye relative to the mobile computing device, and at least one device parameter of the mobile computing device such that the back projection image is approximately equivalent to the view of the user of the real world that is occluded by the permanently non-transparent display.

15. The one or more non-transitory machine-readable storage media of claim 14, wherein to generate the back projection comprises to:
determine, for each display pixel of the permanently non-transparent display, a ray from the user's eye through a corresponding display pixel to the object in the real-world environment;
identify, for each determined ray, an image pixel of the second captured image of the real-world environment corresponding with a position of the object in the real-world environment to which the corresponding ray is directed; and
construct a back projection image based on the identified image pixels for display on the permanently non-transparent display of the mobile computing device.

16. The one or more non-transitory machine-readable storage media of claim 14, wherein the corrected zoom magnitude is a zoom magnitude required to capture an image with the second camera corresponding with the region of the object occluded by the mobile computing device from the user's perspective.

17. The one or more non-transitory machine-readable storage media of claim 14, wherein to:
- determine the position of the user's eye relative to the mobile computing device comprises to determine a position of the user's eye relative to the first camera; and
- determine the distance of the object in the real-world environment relative to the mobile computing device comprises to determine a distance of the object relative to the second camera.

18. The one or more non-transitory machine-readable storage media of claim 14, wherein to determine the distance of the object in the real-world environment relative to the mobile computing device comprises to set a distance of the object relative to the mobile computing device to a predefined distance.

19. The one or more non-transitory machine-readable storage media of claim 14, wherein the plurality of instructions further cause the mobile computing device to display an image on the permanently non-transparent display based on the generated back projection of the real-world environment captured by the second camera.

20. The one or more non-transitory machine-readable storage media of claim 14, wherein the at least one device parameter comprises at least one of (i) a focal length of the second camera, (ii) a size of the permanently non-transparent display, (iii) a size of the mobile computing device, or (iv) a location of components of the mobile computing device relative to a reference point.

21. A method for adjusting a perspective of a captured image for display on a mobile computing device, the method comprising:
- capturing, by a first camera of the mobile computing device and while the user is holding the mobile computing device, a first image of a user of the mobile computing device;
- determining, by the mobile computing device, a position of an eye of the user relative to the mobile computing device based on the first captured image;
- capturing, by a second camera of the mobile computing device different from the first camera, a second image of a real-world environment of the mobile computing device;
- determining, by the mobile computing device, a distance of an object in the real-world environment relative to the mobile computing device based on the second captured image;
- determining an angular size of the mobile computing device from a perspective of the user based on a distance of the user's eye relative to the mobile computing device and a size of the mobile computing device;
- determining a distance of the object in the real-world environment relative to the user based on the distance of the user's eye relative to the mobile computing device and the distance of the object relative to the mobile computing device;
- determining a region of the object occluded by a permanently non-transparent display of the mobile computing device from the user's perspective based on the angular size of the mobile computing device from the user's perspective and the distance of the object relative to the user; and
- determining a corrected zoom magnitude of the second camera based on the determined region of the object occluded by the permanently non-transparent display and the distance of the object relative to the mobile computing device;
- generating, by the mobile computing device on the permanently non-transparent display of the mobile computing device, a back projection image of the real world environment captured by the second camera to the permanently non-transparent display of the mobile computing device based on the corrected zoom magnitude, the determined position of the user's eye relative to the mobile computing device, and at least one device parameter of the mobile computing device such that the back projection image is approximately equivalent to the view of the user of the real world that is occluded by the permanently non-transparent display.

22. The method of claim 21, wherein generating the back projection comprises:
- determining, for each display pixel of the permanently non-transparent display, a ray from the user's eye through a corresponding display pixel to the object in the real-world environment;
- identifying, for each determined ray, an image pixel of the second captured image of the real-world environment corresponding with a position of the object in the real-world environment to which the corresponding ray is directed; and
- constructing a back projection image based on the identified image pixels for display on the permanently non-transparent display of the mobile computing device.

23. The method of claim 21, wherein the corrected zoom magnitude is a zoom magnitude required to capture an image with the second camera corresponding with the region of the object occluded by the mobile computing device from the user's perspective.

* * * * *